US009225093B2

(12) United States Patent
Ahangar et al.

(10) Patent No.: US 9,225,093 B2
(45) Date of Patent: Dec. 29, 2015

(54) POWER CIRCUIT ELECTRICAL CONNECTION SYSTEM

(71) Applicant: ROCKWELL AUTOMATION TECHNOLOGIES, INC., Milwaukee, WI (US)

(72) Inventors: Abdolmehdi Kaveh Ahangar, Cedarburg, WI (US); Steven C. Kaishian, Wauwatosa, WI (US); Mark G. Phillips, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/295,131

(22) Filed: Jun. 3, 2014

(65) Prior Publication Data
US 2014/0287633 A1  Sep. 25, 2014

Related U.S. Application Data

(63) Continuation of application No. 13/563,483, filed on Jul. 31, 2012, now Pat. No. 8,764,495.

(51) Int. Cl.
| H01R 13/05 | (2006.01) |
| H01R 13/15 | (2006.01) |
| H01R 4/48 | (2006.01) |
| H01R 13/17 | (2006.01) |

(Continued)

(52) U.S. Cl.
CPC .............. *H01R 13/15* (2013.01); *H01R 4/4881* (2013.01); *H01R 13/05* (2013.01); *H01R 13/052* (2013.01); *H01R 13/17* (2013.01); *H01R 13/20* (2013.01); *H01R 43/00* (2013.01); *Y10T 29/49208* (2015.01)

(58) Field of Classification Search
CPC ........ H01R 13/52; H01R 13/20; H01R 13/17; H01R 13/05
USPC .......................... 439/825, 927, 845, 843, 846
See application file for complete search history.

(56) References Cited

U.S. PATENT DOCUMENTS

| 919,394 A * | 4/1909 | Taylor et al. ................. 361/131 |
| 995,674 A * | 6/1911 | Hertzberg et al. ............ 439/687 |

(Continued)

FOREIGN PATENT DOCUMENTS

| EP | 1119077 A1 | 6/2014 |
| GB | 1542102 A | 9/1979 |

(Continued)

OTHER PUBLICATIONS

Chinese Office Action in related application No. 201310329307.1 mailed May 6, 2015.

*Primary Examiner* — Abdullah Riyami
*Assistant Examiner* — Vladimir Imas
(74) *Attorney, Agent, or Firm* — Fletcher Yoder P.C.

(57) ABSTRACT

A connector system is provided for use in power applications, such as for conveying three phase power in electrical enclosures. The system comprises plug assemblies in which a power conductor is mounted in a floating arrangement with elastically deformable conductive structures extending from either side thereof. A mating receptacle may be mounted on a bus conductor. Three such arrangements may be provided for conveying three phase power. The structures allow for plug-in mating of the system components while accommodating considerable translational and angular misalignment between the connector parts.

20 Claims, 5 Drawing Sheets

(51) Int. Cl.
*H01R 13/20* (2006.01)
*H01R 43/00* (2006.01)

(56) References Cited

U.S. PATENT DOCUMENTS

| | | | | |
|---|---|---|---|---|
| 1,013,990 | A * | 1/1912 | Du Val | 439/825 |
| 2,175,759 | A * | 10/1939 | Olson | 439/825 |
| 2,260,509 | A * | 10/1941 | Chirelstein | 439/825 |
| 2,674,723 | A * | 4/1954 | Hurlbut | 439/699.1 |
| 3,086,190 | A * | 4/1963 | Neidecker et al. | 439/638 |
| 3,086,191 | A * | 4/1963 | Olashaw | 439/694 |
| 4,191,445 | A | 3/1980 | Deal | |
| 4,416,504 | A * | 11/1983 | Sochor | 439/825 |
| 4,572,606 | A * | 2/1986 | Neumann et al. | 439/843 |
| 4,753,616 | A * | 6/1988 | Molitor | 439/787 |
| 4,810,213 | A * | 3/1989 | Chabot | 439/825 |
| 4,944,701 | A | 7/1990 | Spinner | |
| 5,222,910 | A * | 6/1993 | Boros et al. | 439/699.1 |
| 5,261,840 | A | 11/1993 | Benz | |
| 5,690,518 | A * | 11/1997 | Roy et al. | 439/851 |
| 5,746,620 | A * | 5/1998 | Clark | 439/404 |
| 7,014,516 | B2 * | 3/2006 | Yang | 439/845 |
| 7,204,719 | B2 * | 4/2007 | Kikuchi | 439/631 |
| 7,241,189 | B2 * | 7/2007 | Mohs et al. | 439/845 |
| 7,422,489 | B1 * | 9/2008 | Tseng | 439/699.2 |
| 8,038,488 | B2 * | 10/2011 | Mukuno | 439/845 |
| 8,128,441 | B2 * | 3/2012 | Mukuno | 439/845 |
| 8,512,054 | B2 * | 8/2013 | Lee et al. | 439/131 |

FOREIGN PATENT DOCUMENTS

| | | |
|---|---|---|
| WO | 0057518 A1 | 9/2000 |
| WO | 2008122895 A2 | 10/2008 |

* cited by examiner

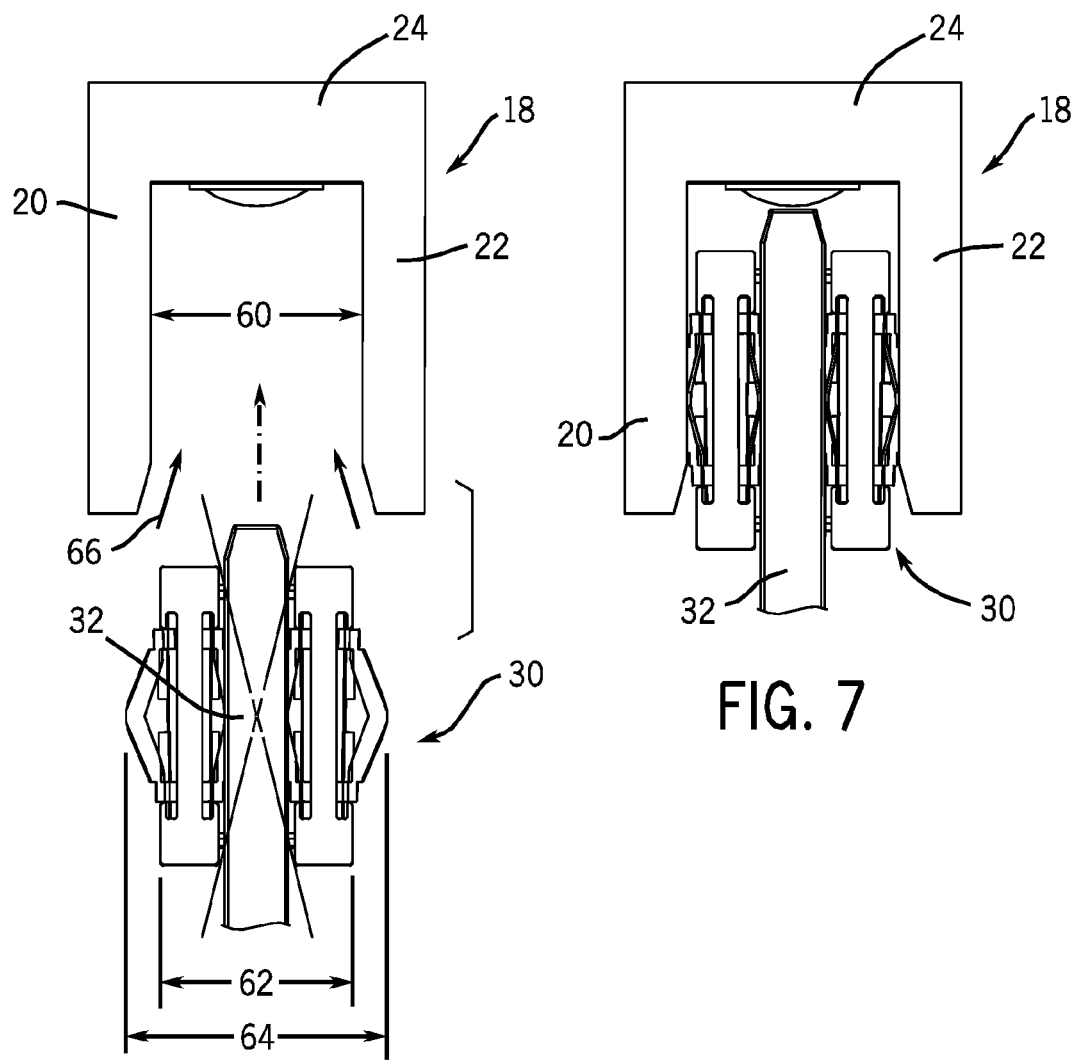

POWER CIRCUIT ELECTRICAL CONNECTION SYSTEM

CROSS-REFERENCE TO RELATED APPLICATIONS

This application is a continuation of Ser. No. 13/563,483, filed Jul. 31, 2012, entitled "Power Circuit Electrical Connection System and Method" in the name of Abdolmehdi Kaveh Ahangar et al.

BACKGROUND

The present invention relates generally to the field of electrical connectors, and more particularly to a plug-in-system capable of carrying high voltage and current loads.

A wide range of electrical connection systems have been developed and are currently in use. For applications that simply convey low voltage and current, or data, simple plug systems are available. For higher voltage and current applications, such as in industrial power electronic systems, sizable conductors are required that need to interface in high efficient manners to convey the desired power between connection points. In industrial contexts, for example, electrical enclosures may be designed with power bus bars carrying three-phase power, such as in a backplane of an electrical cabinet. Devices may be connected to the bus bars by means of stabs which elastically envelope the bus bars to complete the connections. In other contexts, bus bars are designed to interface by bolted or other connections, with quite sizable connectors or direct contact between bus bars routing power to and from power electronic components, such as motor drives, switchgear, circuit protective components, and so forth.

Larger and higher powered connections are particularly difficult insomuch as some flexibility is often desired for removal of components for servicing, while maintaining excellent current carrying capability during normal operation. In certain contexts, conductive wire braids and other flexible structures have been employed for this purpose. In some contexts, however, hard connections are preferred in which AC power bus components are screwed to one another and ultimately to conductors used to route power to or from power electronic devices and switchgear. Where components are intended to be removed from time to time, such as for replacement or servicing, the problems are exacerbated by the need to properly align the bus bar components, despite slight variations in the level or position of the components in the electrical cabinet. Such misalignment is often inevitable, and current designs for power conductors in such environments are unable to accommodate such misalignment while maintaining good connections during operation.

There is a need, therefore, for further improvement in electrical connections designed for high voltage and high current applications. There is a particular need for a design that will allow for some misalignment between bus components and that allows easy withdrawal of one conductor from another, particularly in three-phase applications.

BRIEF DESCRIPTION

The invention provides a novel connector system designed to respond to such needs. The system is based upon the use of conductive busses or similar structures with which a receptacle or plug assembly can be associated. The receptacle receives the plug assembly and electrical connections are made between inner conductive surfaces of the receptacle and resilient conductive components associated with a mating conductor or bus. As the connection is made up, then, the resilient elements are elastically deformed to provide the desired electrical connection between the conductor or bus elements.

In accordance with one aspect of the invention, therefore, an electric power connector system comprises a plug assembly comprising a generally planar power conductor and two side conductor assemblies. Each side conductor assembly is secured to a respective side of the generally planar power conductor via a conductive support, and comprises a plurality of inner conductive elements in contact with the power conductor, and a plurality of conductive extensions opposite the conductive elements. The conductive extensions being biased outwardly and compressible towards the support. A generally fork-shaped conductive receptacle has opposed sides that contact and compress the conductive extensions when the plug assembly is inserted into the receptacle.

The invention also provides an electric power connector system that comprises three such plug assemblies, three generally fork-shaped conductive receptacles, and three bus conductors, one of the receptacles being conductively secured to a respective bus conductor to convey three phase power between the bus conductors and the generally planar power conductors. The arrangement may be configured to convey three phase power.

The invention also provides a method for making an electric power connector system. In the method, a plug assembly is assembled comprising a generally planar power conductor and two side conductor assemblies, each side conductor assembly being secured to a respective side of the generally planar power conductor via a conductive support and comprising a plurality of inner conductive elements in contact with the power conductor, and a plurality of conductive extensions opposite the conductive elements, the conductive extensions being biased outwardly and compressible towards the support. The plug assembly is configured to mate with a generally fork-shaped conductive receptacle having opposed sides, wherein the opposed sides contact and compress the conductive extensions when the plug assembly is inserted into the receptacle.

DRAWINGS

These and other features, aspects, and advantages of the present invention will become better understood when the following detailed description is read with reference to the accompanying drawings in which like characters represent like parts throughout the drawings, wherein:

FIG. 6 is a top view illustrating the system receptacle and plug assembly prior to mating; and FIG. 7 is a top view of the same components once mated.

DETAILED DESCRIPTION

Figure 1:
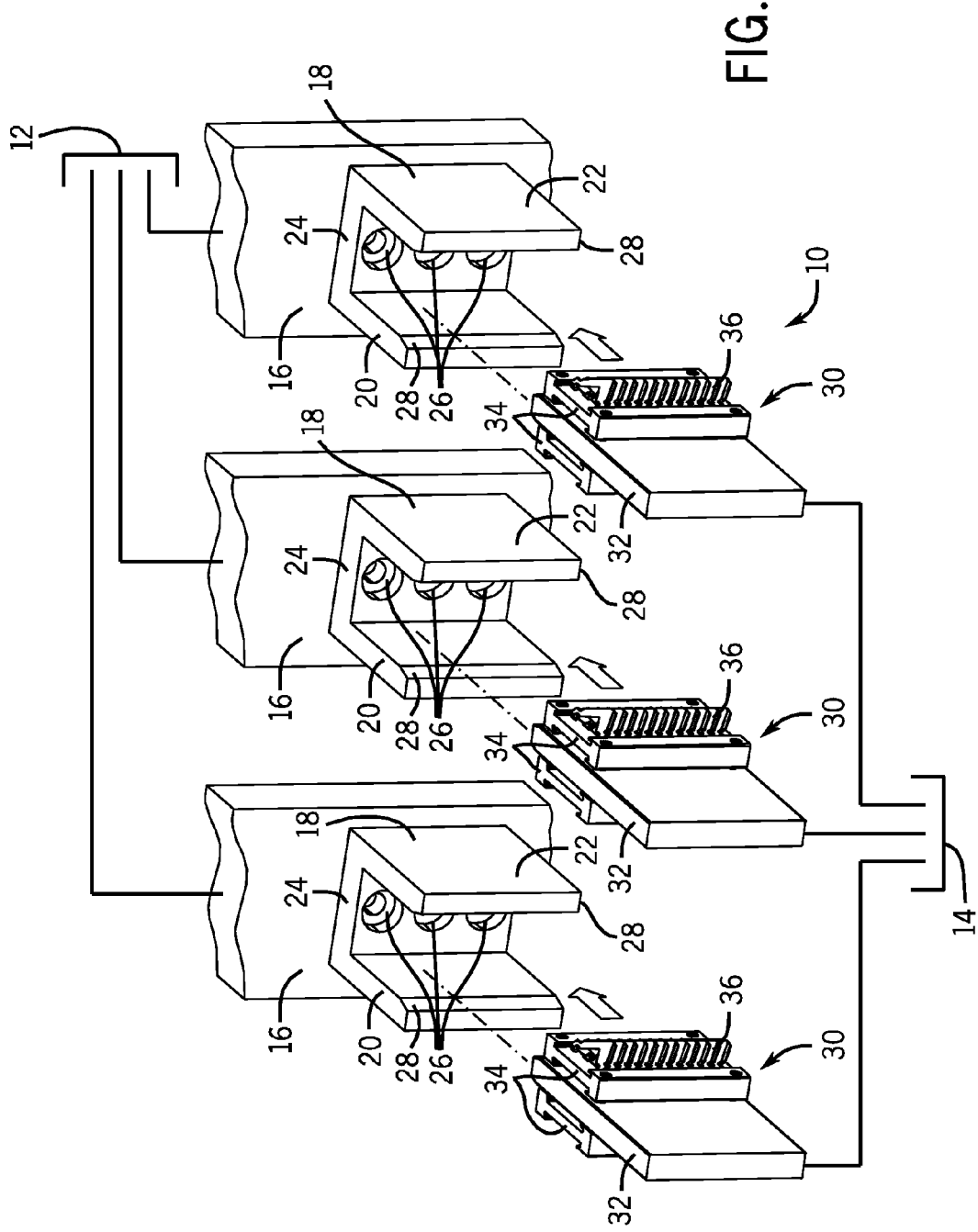
FIG. 1 is a perspective view of an exemplary three-phase connection system in accordance with certain aspects of the present invention.

Turning to the drawings, FIG. 1 illustrates an exemplary connector system 10 designed for use in high voltage and high current applications. By way of example, the system may be suitable for use in power electronic circuits, switch gear, motor drives, and other applications in a variety of voltage and current ranges. The system illustrated in FIG. 1 is particularly well-suited to use in electrical cabinets wherein three-phase power is routed through bus bars to and/or from power electronic components and switchgear. As will be appreciated by those skilled in the art, in such applications, power from a source, as indicated by reference numeral 12 is typically routed through a cabinet, such as in a rear backplane of an electrical enclosure. Power exiting from the connections is fed to various loads as indicated by reference numeral 14. Such loads may include the circuit protective components in the cabinet, but also various control components, such as motor drives, motor starters, contactors, relays, and so forth. It should be noted that although the incoming power is illustrated as corresponding to reference numeral 12 in the outgoing power to the load is indicated by reference 14 in FIG. 1, the roles of the various components of the connector system may be reversed in practice.

In the illustrated embodiment, the incoming power 12 is channeled to bus bars 16 which will commonly comprise significant conductive elements such as bars of copper. The connector system then comprises receptacles 18 that are secured to the bus bars and extend from a conductive surface of the bus bars. The receptacles include side contacts 20 and 22 and a rear side 24 joined to the side contacts. The receptacles are secured to the bus bars by fasteners 26. The fasteners provide mechanical support for the receptacles as well as hold the rear face of the rear side in close conductive contact with the respective bus bar. Front extremities of the side contacts 20 and 22 of the receptacles 18 are provided with a chamfer surfaces 28 to facilitate engagement of the receptacles with mating plug assemblies as described below.

Plug assemblies 30 are provided that may be formed as an extension of mating conductors 32. In some embodiments, the mating conductors may also be substantial metal components, such as copper bars which extend to switch gear or other circuitry, such as motor controllers. The plug assemblies 30 are supported on component supports (not shown) and tied to the mating components that receive power from the bus bars via the receptacles and plug assemblies. Each plug assembly also includes one or more supports 34 secured to the mating conductor 32. These supports hold and provide mechanical support for resilient contact structures. As described more fully below, the resilient contact structures make contact with the mating conductor 32 and the supports 34, and extend outwardly from the supports 34 to make contact with the inner surfaces of the side contacts 20 and 22 of the receptacles when the plug assemblies are inserted into the receptacles.

Figure 2:
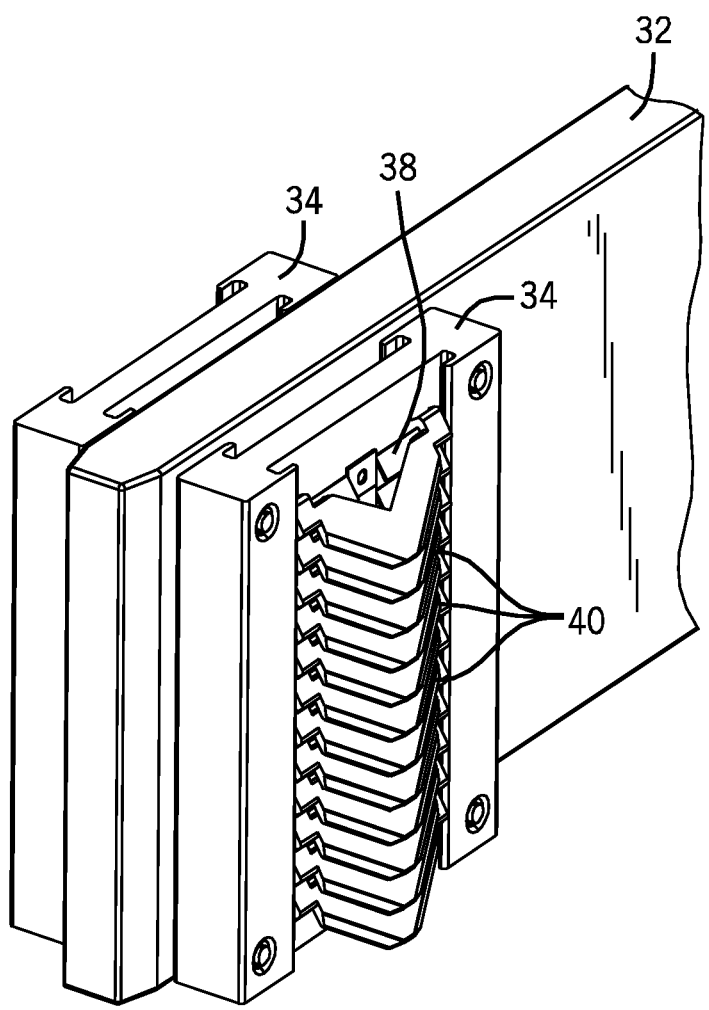
FIG. 2 is a perspective view of an exemplary plug assembly for use in the system of FIG. 1.
Figure 3:
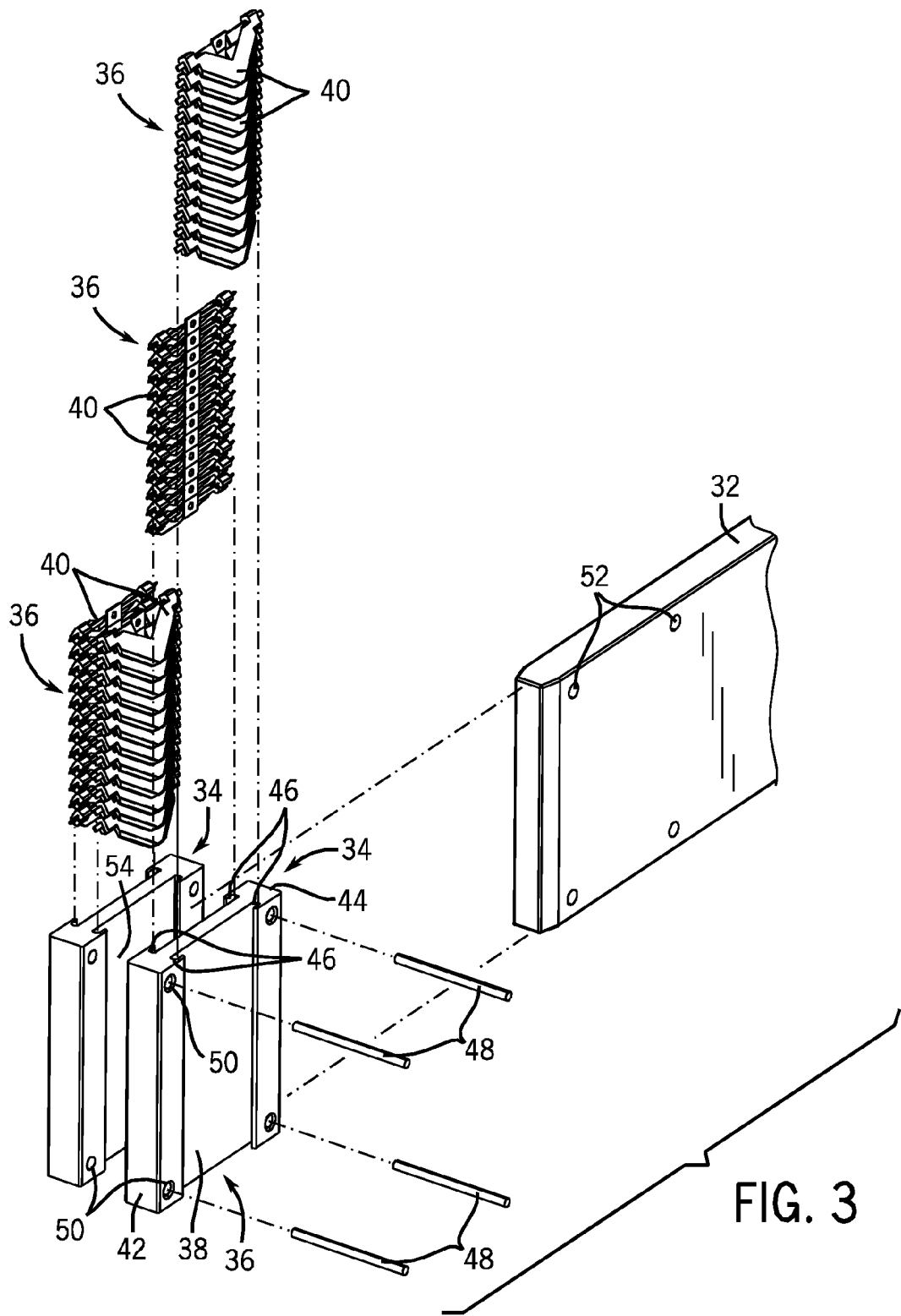
FIG. 3 is an exploded view of the exemplary plug assembly of FIG. 2.

FIG. 2 illustrates an exemplary plug assembly of the type shown in the system of FIG. 1. Again, the plug assembly includes a mating conductor 32 which carries current during operation. The conductor 32 carries one or more supports 34 for the resilient contact structures 36. Each of these resilient contact structures includes a series of conductive elements including inner conductive elements 38 and conductive extensions 40. These conductive elements and conductive extensions comprise assemblies of supports and flexibly mounted conductors. The inner conductive elements 38 make contact with the mating conductor 32 when the supports 34 are mounted onto the mating conductor. The conductive extensions 40 comprise conductive material which extends outwardly from the supports and that can be elastically deformed relatively easily by pressure on either side of the structure. In a presently contemplated embodiment, the supports include upper and lower T-structures forming grooves 46 into which the resilient contact structures 36 are inserted. The resilient contact structures and supports are held onto the mating conductor 32 by a series of pins or fasteners 48 that are received in apertures 50 formed in the supports and corresponding apertures 52 formed in the mating conductor. In a presently contemplated embodiment, the apertures 52 of the mating conductor are somewhat oversized, while the apertures 50 of the supports provide a press fit for the fasteners. This arrangement, in conjunction with the elastically deformable nature of the inner conductive elements 38 allow the mating conductor 32 to "float" between the elastic conductive structures on either side of it. This, and the elastically deformable nature of the conductive extensions, allows for considerable tolerance to misalignment when making up the connector system.

The supports 34 are made of a conductive material through which current passes during operation. Conductive elements 38 of the resilient contact structures to extend inwardly to make good contact with the side faces of the mating conductor 32. In the illustrated embodiment the mating conductor is a generally planar conductive metal such that the faces may provide good surfaces for contact with the inner conductive elements 38. In operation, a current path is established from the resilient extensions 40, through the supports 34, and through the inner conductor elements 38 to the mating conductor 32.

Figure 4:
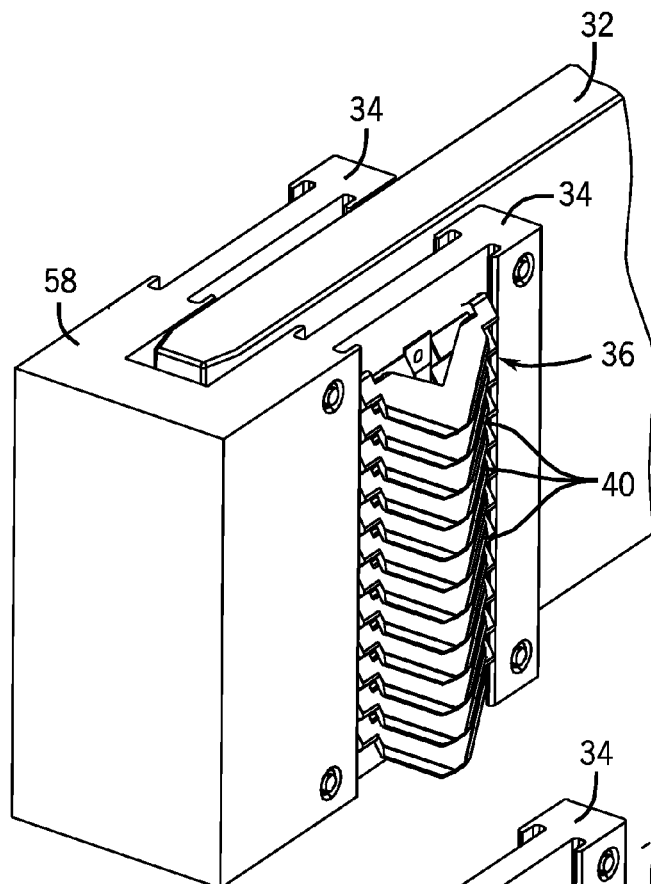
FIG. 4 is a perspective view of an alternative configuration of a plug assembly for use in the system.
Figure 5:
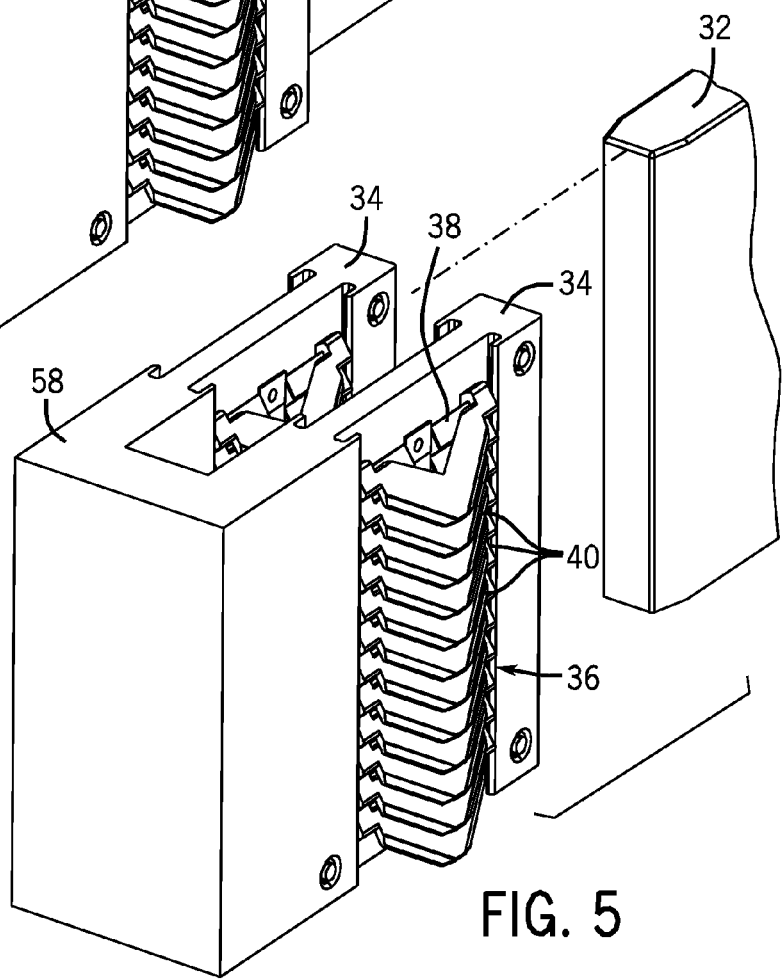
FIG. 5 is an exploded view of the arrangement of FIG. 4.

FIGS. 4 and 5 illustrate a U-shaped support 58 that may be used in place of the separate supports of the previous embodiment. The U-shaped support similarly forms a mechanical support for the resilient contact structures 36, but may wrap fully around an end of the mating conductor 32. As with the previous embodiment, the U-shaped support is made of a conductive material and allows for the inner connective elements 38 of the resisting contact structures to contact faces of the mating conductor 32 to maintain it in a "floating" position between extensions of the U-shaped support. In the illustrated embodiment the U-shaped support is secured to the mating conductor 32 by pins or fasteners 48 as in the previous embodiment.

FIG. 6 represents a top view of the foregoing structure (the first embodiment) prior to mating of the receptacle 18 and the plug assembly 30. As shown, the receptacle is supported on the electrical bus, and extends outwardly from the bus with the side contacts 20 and 22 presenting a volume into which the plug assembly 30 is introduced. The receptacle width 60 is dimensioned to allow for slight elastic compression, deformation or movement of the conductive extensions 40 as the plug assembly is pressed into the receptacle. As discussed above, the side contacts may be formed with chamfer surfaces to facilitate such compression. The plug assembly is presented with the conductive extensions in a relaxed state to extend outwardly from the sides of the plug assembly. An outer dimension of the supports 34, indicated by reference numeral 62 is less than the inner width 60 of the receptacle, while a relaxed width 64 of the conductive extensions is somewhat greater than the inner receptacle width 60. Thus, as the plug assembly is urged into the receptacle, the conductive extensions will be elastically deformed, compressing somewhat to conform to the inner width 60 of the receptacle. This orientation is shown in FIG. 7 wherein the plug assembly has been fully engaged into the mating receptacle.

It should be noted that the use of the conductive extensions 40 and other components of the plug assembly allow for both translational and angular misalignment of the plug assembly with respect to the receptacle. That is, as illustrated in FIG. 6, if the access of the receptacle is somewhat displaced from the access of the plug assembly, the two may nevertheless make adequate contact owing to the deformability of the inner conductive elements 38 and the conductive extensions 40. Similarly, angular misalignment, as indicated by reference numeral 66 in FIG. 6, may be accommodated by the conductive elements and extensions. That is, in the case of slight angular misalignment, the conductive elements and extensions along each side of the receptacle may compressed slightly differently, while still maintaining adequate contact.

It should be noted that any desired number of conductive elements may be used on each side of the plug assembly, particularly depending upon the power rating of the connector system. The length of the side contacts 20 and 22 are sufficient to allow for full engagement of the plug assembly in the receptacle so that all conductive extensions are in contact with a conductive surface of the side contacts 20 and 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electric power connector system comprising:
a plug assembly comprising a generally planar power conductor and two side conductor assemblies, each side conductor assembly being secured to a respective side of the generally planar power conductor via a conductive support and comprising a plurality of inner conductive elements in contact with the power conductor, and a plurality of conductive extensions opposite the conductive elements, the conductive extensions being biased outwardly and compressible towards the support.

2. The system of claim 1, wherein the inner conductive elements comprise elastically movable elements that hold the generally planar power conductor in a floating position between the two side conductor assemblies.

3. The system of claim 1, wherein the support comprises two separate conductive supports, one conductive support being disposed on each side of the generally planar power conductor.

4. The system of claim 1, wherein the support comprises a generally U-shaped support element secured around an end of the generally planer power conductor.

5. The system of claim 1, wherein the support is secured to the generally planar power conductor via fasteners.

6. The system of claim 5, wherein the fasteners comprise pins.

7. The system of claim 6, wherein the generally planar power conductor comprises apertures through which the pins pass to maintain the generally planar power conductor in a floating position between the two side conductor assemblies.

8. The system of claim 1, wherein the conductive extensions comprise spring-like conductors that are elastically deformed when the plug assembly is inserted into the receptacle.

9. The system of claim 1, wherein the conductive extensions on each side of the generally planar power conductor are configured to deflect to accommodate misalignment between the generally planar power conductor and a receptacle.

10. An electric power connector system comprising:
three plug assemblies each comprising a generally planar power conductor and two side conductor assemblies, each side conductor assembly being secured to a respective side of the generally planar power conductor via a conductive support and comprising a plurality of inner conductive elements in contact with the power conductor, and a plurality of conductive extensions opposite the conductive elements, the conductive extensions being biased outwardly and compressible towards the support.

11. The system of claim 10, wherein the support comprises a generally U-shaped support element secured around an end of the generally planer power conductor.

12. The system of claim 10, comprising the inner conductive elements of each side conductor assembly comprises elastically movable elements that hold the generally planar power conductor in a floating position between the two side conductor assemblies.

13. The system of claim 10, wherein the support of each plug assembly comprises two separate conductive supports, one conductive support being disposed on each side of the generally planar power conductor.

14. The system of claim 10, wherein the generally planar conductor of each plug assembly is mounted between respective side conductor assemblies to hold the generally planar power conductor in a floating position between the two side conductor assemblies.

15. An electric power connector system comprising:
a plug assembly comprising a generally planar power conductor and two side conductor assemblies, each side conductor assembly being secured to a respective side of the generally planar power conductor and comprising a plurality of inner conductive elements in contact with the power conductor, and a plurality of conductive extensions opposite the conductive elements, the conductive extensions being biased outwardly.

16. The system of claim 15, wherein each side conductor assembly is secured to the respective side of the generally planar support via a conductive support.

17. The system of claim 15, wherein each of the conductive extensions is compressible towards the support.

18. The system of claim 15, wherein the support comprises a generally U-shaped support element secured around an end of the generally planer power conductor.

19. The method of claim 15, comprising the inner conductive elements of each side conductor assembly comprises elastically movable elements that hold the generally planar power conductor in a floating position between the two side conductor assemblies.

20. The method of claim 15, wherein the generally planar conductor is mounted between respective side conductor assemblies to hold the generally planar power conductor in a floating position between the two side conductor assemblies.

* * * * *